(12) United States Patent
Jacobs

(10) Patent No.: US 7,086,675 B2
(45) Date of Patent: Aug. 8, 2006

(54) MAGNETIC VACUUM GRIPPER INCLUDING INFLATABLE BELLOWS

(75) Inventor: Adrianus Franciscus Maria Jacobs, Valkenswaard (NL)

(73) Assignee: Goudsmit Magnetic Systems BV, Waalre (NL)

( * ) Notice: Subject to any disclaimer, the term of this patent is extended or adjusted under 35 U.S.C. 154(b) by 0 days.

(21) Appl. No.: 11/007,478

(22) Filed: Dec. 8, 2004

(65) Prior Publication Data

US 2005/0134063 A1 Jun. 23, 2005

(30) Foreign Application Priority Data

Dec. 8, 2003 (NL) .................................... 1024965

(51) Int. Cl.
*A47G 21/10* (2006.01)
(52) U.S. Cl. ..................... 294/2; 294/64.1; 294/65.5
(58) Field of Classification Search ............... 294/65.5, 294/2, 64.1
See application file for complete search history.

(56) References Cited

U.S. PATENT DOCUMENTS

| | | | | |
|---|---|---|---|---|
| 3,159,418 A | * | 12/1964 | Hansen | 294/2 |
| 4,002,141 A | * | 1/1977 | Shrader | 118/730 |
| 4,121,865 A | * | 10/1978 | Littwin, Sr. | 294/2 |
| 4,504,088 A | * | 3/1985 | Carter | 294/65.5 |
| 6,538,544 B1 | | 3/2003 | Hardy | |

* cited by examiner

*Primary Examiner*—Eileen D. Lillis
*Assistant Examiner*—Esther Onyinyechi Okezie
(74) *Attorney, Agent, or Firm*—Eric Karich

(57) ABSTRACT

A gripping device for gripping an object has a vacuum gripper; a magnet disposed within the vacuum gripper and moveable between a gripping position and a retracted position; gripping vacuum for moving the magnet to the gripping position; and release for moving the magnet to the retracted position.

2 Claims, 5 Drawing Sheets

MAGNETIC VACUUM GRIPPER INCLUDING INFLATABLE BELLOWS

BACKGROUND OF THE INVENTION

1. Field of the Invention

This invention relates generally to gripping devices, and more particularly to gripping devices for gripping and lifting an object.

2. Description of the Related Art

Another gripping device is disclosed in U.S. Pat. No. 4,121,865. In this device, a permanent magnet is connected to a piston that can move in a cylinder. This piston can be moved by compressed air against the force of a spring. For this purpose, a compressed air line is connected to the cylinder. Furthermore, a vacuum line is connected to the vacuum chamber. This reference is hereby incorporated by reference in full.

SUMMARY OF THE INVENTION

The present invention teaches certain benefits in construction and use which give rise to the objectives described below.

The present invention provides a gripping device that includes a means of producing a vacuum and the means of blowing air in a single apparatus that can produce a vacuum as well as that can blow air. The device is connected to the vacuum chamber as well as to the pressure chamber. Because of this, it is possible for an object to be gripped as well as pushed away with one device. Preferably, the apparatus is a pump that works in two directions or a venturi with a blowing function.

A favourable embodiment of the gripping device according to the invention is characterized in that the vacuum inlet as well as the air inlet are connected to one passage that is connected to the apparatus. Because of this, only one line has to be connected to the apparatus, which line is connected to the passage at its other end.

A further favourable embodiment of the gripping device according to the invention is characterized in that the gripping device comprises a shut-off valve or a restrictive device which may or may not be adjustable, which shuts off or constricts the connection between the apparatus and the vacuum chamber when the apparatus is blowing air. Because of this, the gripping magnet can be moved away from the gripped object more easily.

In an embodiment the means of releasing comprises a cylinder, the interior of which is the pressure chamber, as well as a piston that can move in the cylinder, to which piston a magnet is fastened, and where the air inlet is situated nearby the open side of the vacuum chamber in the cylinder.

In another embodiment the means of releasing comprises an inflatable bellows, the interior of which is the pressure chamber, which bellows is situated round about the gripping magnet or is connected to the gripping magnet and when it is inflated pushes the object and the gripping magnet away from each other. In this embodiment, the sealing edge is preferably situated on the bellows' underside.

It is noted that a gripping device with a vacuum gripper and a gripping magnet and an inflatable bellows for pushing the gripping magnet and the gripped object away from each other can be used independently of a pump which works in two directions and that the possibility expressly be kept open to protect the embodiments of the gripping device with a bellows which are independent of the use of a pump that works in two directions.

In still another embodiment, the means of releasing comprises a membrane to which the gripping magnet is connected, which membrane is a wall of the pressure chamber and can move the gripping magnet.

The invention also relates to a lifting device for lifting an object, in particular a plate, comprising a gripping device according to the invention, as well as a means of lifting in order to raise and lower the gripping device.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

The above-described drawing figures illustrate the invention, a gripping device 1 for gripping and lifting an object 2, such as a plate.

Figure 1:
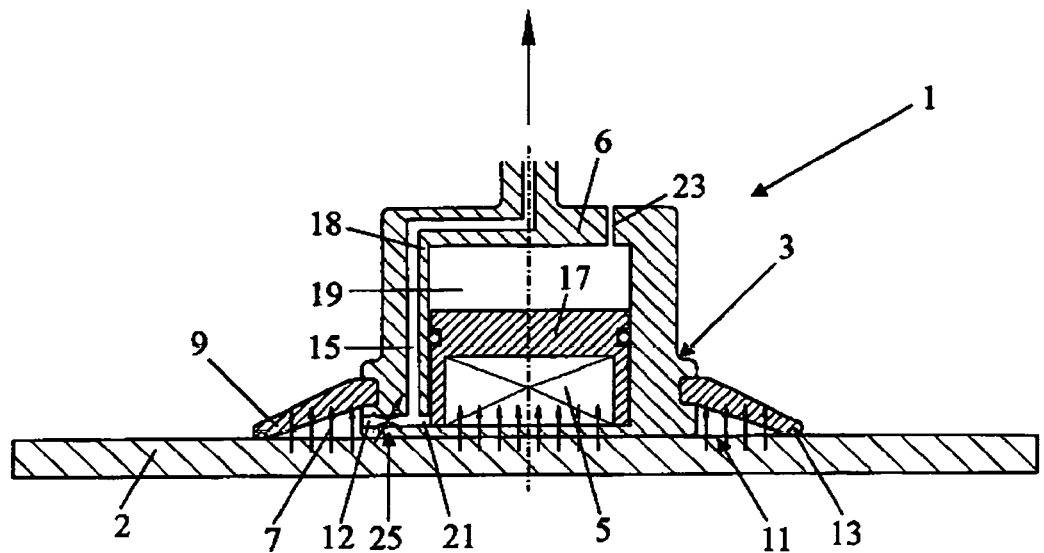
FIGS. 1 and 2 show a first embodiment of the gripping device according to the invention with a gripping magnet which can move in a cylinder, while it is gripping and releasing a plate respectively.
Figure 2:
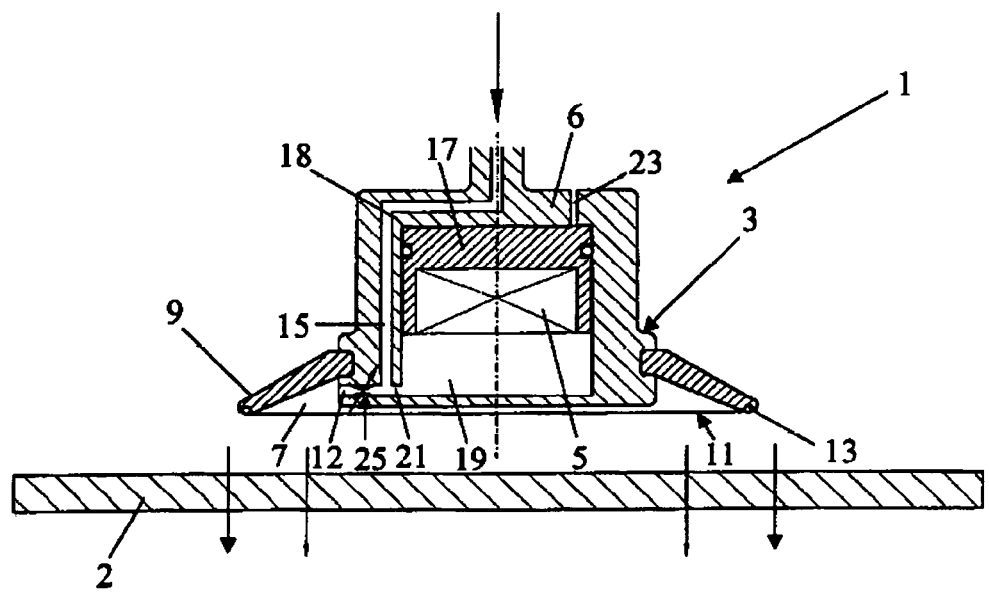

In FIGS. 1 and 2, a first embodiment of the gripping device 1 includes a means of gripping according to the invention is shown while it is gripping and releasing the plate 2 respectively. While the plate 2 is described herein, those skilled in the art will recognize that alternative objects may also be gripped with the present invention, as such alternatives should be considered within the scope of the present invention.

In this embodiment, the means of gripping is made up of a vacuum gripper 3 and a gripping magnet 5, which are integrated into one unit. The unit has a casing 6 in which the gripping magnet 5, which is a permanent magnet, is situated. The vacuum gripper 3 has a vacuum chamber 7 which is open on the underside 11 and is bounded along its perimeter by a flexible saucer-shaped wall 9. The underside of the wall 9 is provided with a sealing edge 13. One wall of the vacuum chamber 7 is provided with a vacuum inlet 12 which is connected to a means of producing a vacuum through a passage 15, situated in the casing 6.

In this embodiment the means of releasing is a means of retracting in order to retract the gripping magnet 5. The means of retracting comprises a piston 17 attached to or otherwise associated with the gripping magnet 5 and adapted to move in a cylinder 18. The space in the cylinder 18 is a pressure chamber 19 that through an air inlet 21 situated near the open side 11 of the vacuum chamber in the casing 6 is connected to the passage 15 and is connected to a means of blowing air. The means of producing a vacuum and the means of blowing in air are integrated in a pump which works in two directions (not shown). An additional passage 23 serves as a vent for the pressure chamber above the piston 17.

There is an adjustable restrictive device 25 (shown schematically) in the vacuum inlet 12. The pump that works in two directions can create a vacuum in the vacuum chamber 7 and can suck the piston 17 downwards (see FIG. 1) or blow the piston 17 upwards (see FIG. 2).

In order to grip the plate 2, the gripping magnet 5 is brought into the lower position, see FIG. 1, by drawing air out of the pressure chamber 19 under the piston 17 through the passage 15. In this position, the gripping magnet 5 is close to the plate 2 and the plate 2 is pulled up towards it. When in the process of gripping, a vacuum is created in the space 7 as a result of which the plate 2 is also gripped by the vacuum gripper 3.

In order to release the plate 2 the gripping magnet 5 is retracted, see FIG. 2. This takes places by blowing air into the pressure chamber 19 under the piston 17 through the passage 15. By doing this, the piston is pushed upwards and comes to a distance from the plate 2, as a result of which the magnetic attraction is reduced and the force of gravity exerted on the plate 2 overcomes the magnet's force of attraction. In addition, air is blown into the vacuum chamber 7 at the same time as a result of which the attraction of the plate 2 due to the vacuum is ended and it is blown away from the gripping device 1.

Figure 3:
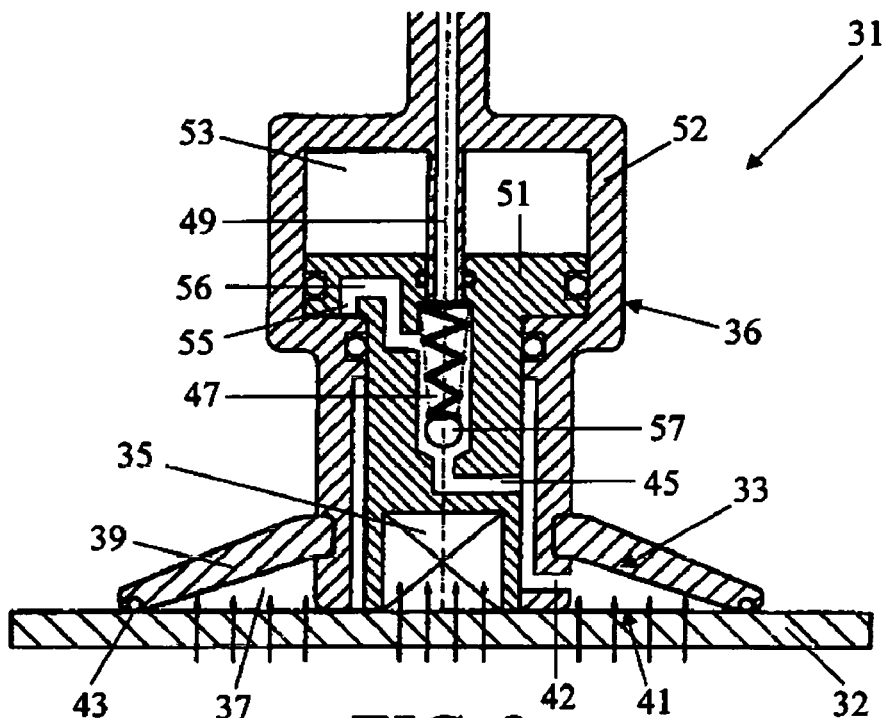
FIGS. 3 and 4 show a second embodiment of the gripping device according to the invention with a gripping magnet attached to a piston that can move in a cylinder, while it is gripping and releasing a plate respectively.
Figure 4:
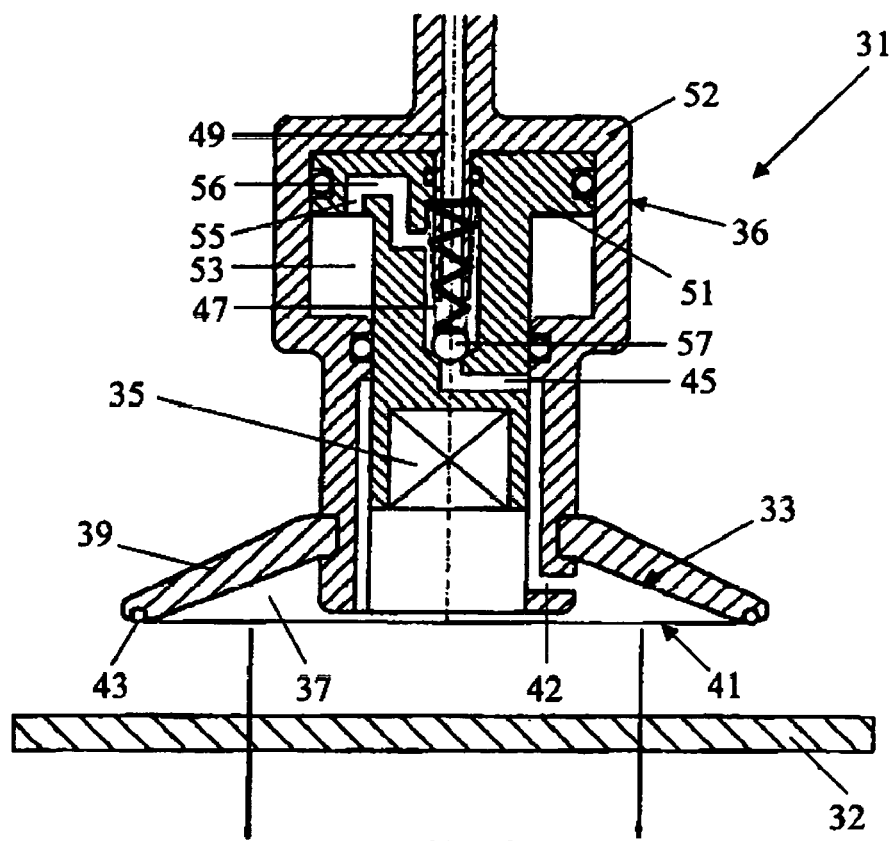

In FIGS. 3 and 4 a second embodiment of the gripping device 31 according to the invention is shown, again while it is gripping and releasing a plate 32 respectively. Here as well, the means of gripping is made up of a vacuum gripper 33 and a gripping magnet 35, which are integrated into one unit. The unit has a casing 36 in which the gripping magnet 35 is situated. The vacuum gripper 33 has a vacuum chamber 37 that is bounded along its perimeter on the open side 41 by a wall 39, which is provided with a sealing edge 43 on its underside. The vacuum chamber 37 is connected through a vacuum inlet 42 and passages 45, 47 and 49 to a pump that works in two directions (not shown), which functions as a means of producing a vacuum in one direction and a means of blowing air in the other direction.

In this embodiment as well, the means of releasing is made up of a means of retracting with a piston 51 which can move in a cylinder 52 and is connected to the gripping magnet 35. However, this cannot now move in the pressure chamber 53 in the cylinder 52, but is situated outside the cylinder 52. Furthermore, the air inlet 55 is not situated in the cylinder wall now, but in the piston 51.

In order to grip the plate 32, the gripping magnet 35 is brought into the lower position, see FIG. 3, by creating a vacuum under the piston 51 through the passage 56 and the passages 47 and 49. At the same time, a vacuum is created in the space 37 through the passages 45, 47 and 49. In order to release the plate 32 the gripping magnet 35 is retracted, see FIG. 4, by blowing air under the piston 51 through the passages 47, 49 and 56. Here, a shut-off valve made up of a ball 57 shuts off the air supply to the passage 45. Because of this, the gripping magnet 35 comes to a distance from the plate 32.

Figure 5:
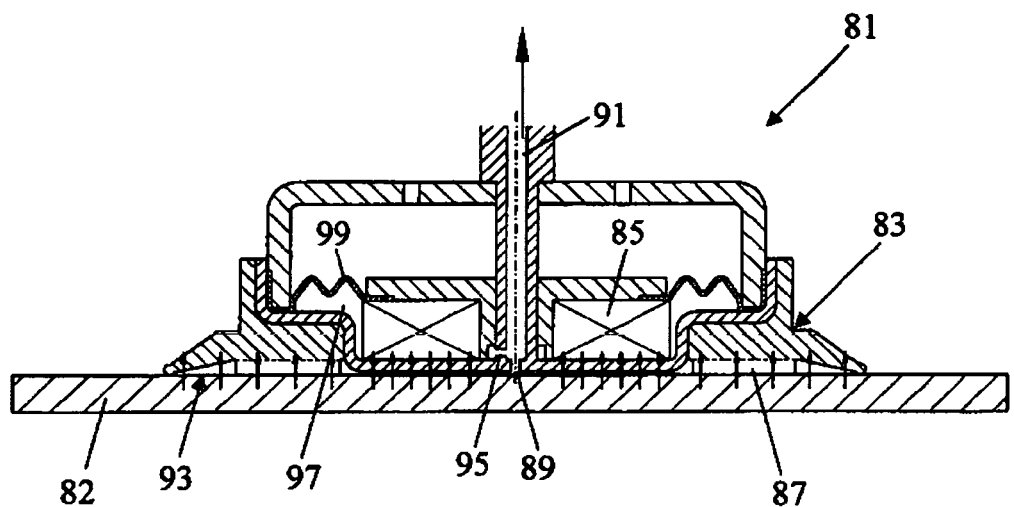
FIGS. 5 and 6 show a third embodiment of the gripping device according to the invention with a gripping magnet which can move by means of a membrane, while it is gripping and releasing a plate respectively.
Figure 6:
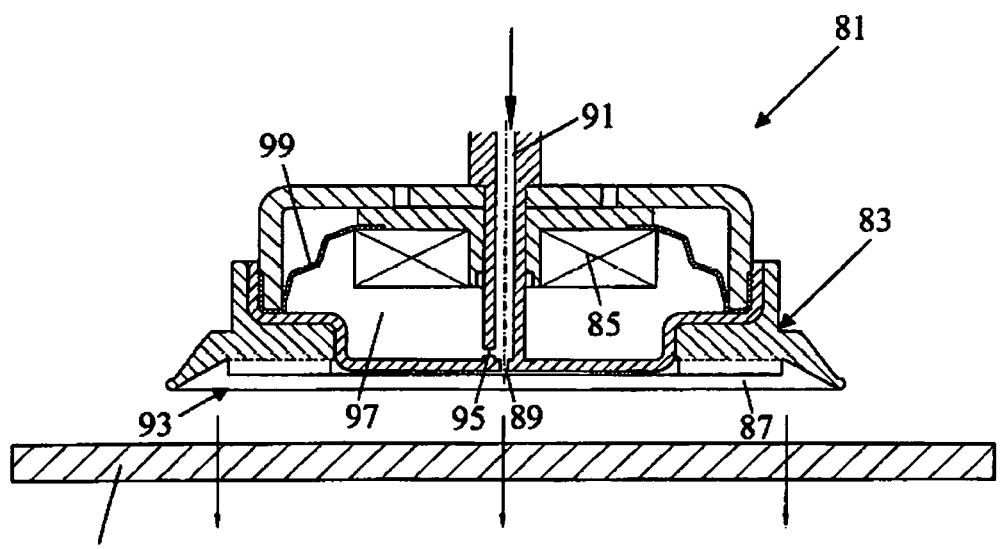

In FIGS. 5 and 6 a third embodiment of the gripping device 81 according to the invention is shown, again while it is gripping and releasing a plate 82 respectively. Here as well, the means of gripping is made up of a vacuum gripper 83 and a gripping magnet 85, which are integrated into one unit. The vacuum gripper 83 also has a vacuum chamber 87 which is connected through a vacuum inlet 89 to a passage 91 that is connected to a pump which works in two directions. Here also the means of releasing is a means of retracting which can move the gripping magnet 85 away from the open side 93 of the vacuum chamber 87 by blowing air through the passage 91 and an air inlet 95 into a pressure chamber 97.

This embodiment of the gripping device 81 is comparable to the first embodiment of the gripping device 1 (see FIGS. 1 and 2), only now the gripping magnet 85 is not guided by the piston and the cylinder's wall, but by a membrane 99 that is a part of the boundary of the pressure chamber 97.

Figure 7:
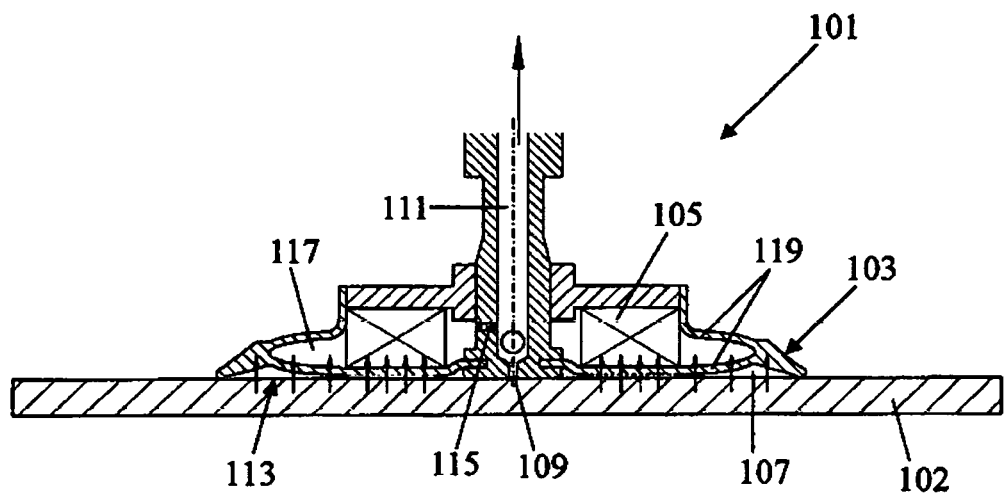
FIGS. 7 and 8 show a fourth embodiment of the gripping device according to the invention with a bellows round about a gripping magnet which can move, while it is gripping and releasing a plate respectively.
Figure 8:
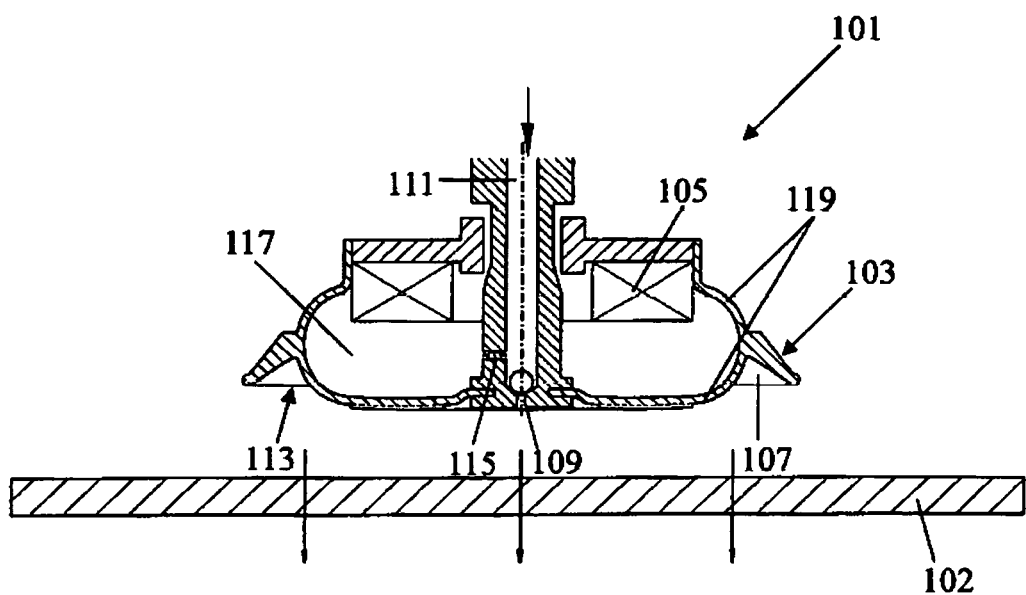

In FIGS. 7 and 8 a fourth embodiment of the gripping device 101 according to the invention is shown, again while it is gripping and releasing a plate 102 respectively. Here as well, the means of gripping is made up of a vacuum gripper 103 and a gripping magnet 105, which are integrated into one unit. The vacuum gripper 103 once again has a vacuum chamber 107 which is connected through a vacuum inlet 109 to a passage 111 that is connected to a pump which works in two directions. Here also the gripping magnet 101 can move to and from the open side 113 of the vacuum chamber by blowing air through the passage 111 and an air inlet 115 into a pressure chamber 117.

Unlike in the above embodiments, the means of releasing is made up of an inflatable bellows 119 which is situated partially round about the gripping magnet 105 and is connected to it. While air is being blown into the bellows 119, it swells as a result of which it pushes the plate 102 away from the vacuum chamber 107 and at the same time the bellows 119 pushes the gripping magnet, which is attached to the bellow's upper side, away from the plate 102, see FIG. 8.

Figure 9:
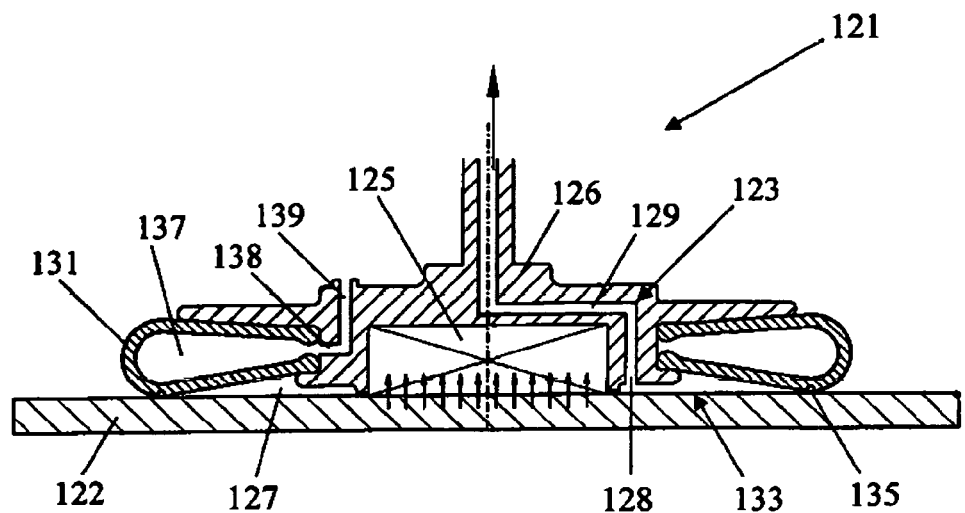
FIGS. 9 and 10 show a fifth embodiment of the gripping device according to the invention with a bellows situated round about a gripping magnet, while it is gripping and releasing a plate respectively.
Figure 10:
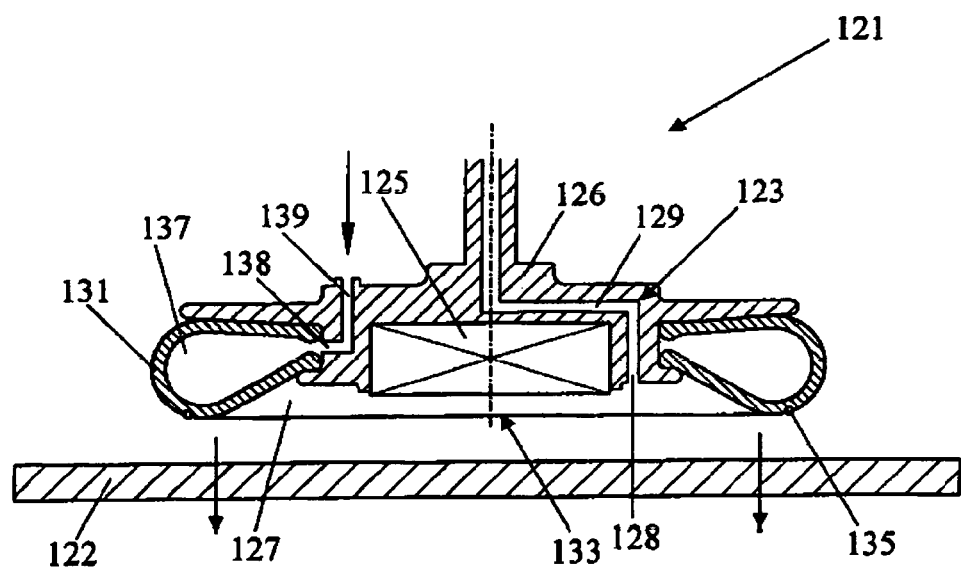

Finally, in FIGS. 9 and 10 a fifth embodiment of the gripping device 121 according to the invention is shown in a cross-section, again while it is gripping and releasing a plate 122 respectively. Here as well, a vacuum gripper 123 and a gripping magnet 125 are integrated into one unit. The unit has a casing 126 with a space in the middle in which the gripping magnet 125 is fastened. The vacuum gripper 123 has a vacuum chamber 127 which is connected through a vacuum inlet 128 to a passage 129 that is connected to a means of producing a vacuum (not shown).The vacuum chamber 127 is open on the underside and is bounded along its perimeter by an inflatable bellows 131, which also is the boundary of the open side 133 of the vacuum chamber. This bellows 131 is provided with a sealing edge 135 on its underside, which is in contact with the plate 122 while gripping the plate, see FIG. 10. The gripping magnet 125 is situated inside the sealing edge 135 in the vacuum chamber 127, in which the vacuum chamber, as viewed from a horizontal direction, is situated round about the gripping magnet 125.

In order to release the gripping device 125 and the plate 122 from each other, the means of gripping is provided with a means of releasing, which in this embodiment is the inflatable bellows 131. The space 137 in the bellows is connected to a means of blowing air (not shown) through an air inlet 138 and an additional passage 139 situated in the casing 126. When the bellows 131 is inflated it pushes the plate 122 away from the gripping magnet 125. The means of blowing air and the means of producing a vacuum may be executed here as separate pumps.

Although in the above the invention is explained on the basis of the drawings, it should be noted that the invention is in no way limited to the embodiments shown in the drawings. The invention also extends to all embodiments deviating from the embodiments shown in the is drawings within the context defined by the claims. Thus, the gripping magnet can also be situated concentrically about the vacuum chamber, instead of concentrically in the vacuum chamber as is shown here.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A gripping device for gripping an object, the gripping device comprising:

a vacuum gripper;

a magnet disposed within the vacuum gripper and moveable between a gripping position and a retracted position;

gripping means for moving the magnet to the gripping position; and releasing means for moving the magnet to the retracted position, wherein the releasing means comprises an inflatable bellows positioned about the magnet, and wherein the inflatable bellows comprises a sealing edge adapted for contacting the object.

2. A gripping device for gripping an object, the gripping device comprising:

a vacuum gripper;

a magnet disposed within the vacuum gripper and moveable between a gripping position and a retracted position;

gripping means for moving the magnet to the gripping position; and releasing means for moving the magnet to the retracted position, wherein the releasing means comprises an inflatable bellows positioned about the magnet, and wherein a gas under pressure is introduced into the inflatable bellows, the inflatable bellows expands, and the magnet is moved away from the object.

* * * * *